United States Patent [19]
Yoshida et al.

[11] Patent Number: 5,930,222
[45] Date of Patent: Jul. 27, 1999

[54] PRE-PIT DETECTING DEVICE AND INFORMATION RECORDING APPARATUS EMPLOYING THE SAME

[75] Inventors: Masayoshi Yoshida; Kenji Mito; Toshio Suzuki, all of Tokorozawa, Japan

[73] Assignee: Pioneer Electronic Coporation, Tokyo, Japan

[21] Appl. No.: 09/055,255

[22] Filed: Apr. 6, 1998

[30] Foreign Application Priority Data

Apr. 7, 1997 [JP] Japan ................................. 9-088498

[51] Int. Cl.⁶ ........................... G11B 11/03; G11B 11/12; G06F 7/22
[52] U.S. Cl. ................... 369/116; 369/44.26; 369/44.37; 369/275.4
[58] Field of Search ................................. 369/116, 275.4, 369/44.26, 44.37, 275.1, 47, 48, 58

[56] References Cited

U.S. PATENT DOCUMENTS

| | | | |
|---|---|---|---|
| 5,040,165 | 8/1991 | Taii et al. ............................... | 369/275.4 |
| 5,604,726 | 2/1997 | Karube ................................. | 369/275.4 |
| 5,774,437 | 6/1998 | Yoshida ................................ | 369/275.4 |
| 5,822,286 | 10/1998 | Nakayama et al. ................... | 369/275.4 |
| 5,844,882 | 12/1998 | Yoshida et al. ....................... | 369/275.4 |
| 5,844,883 | 12/1998 | Kanno et al. ......................... | 369/275.4 |
| 5,850,378 | 12/1998 | Ninamino et al. .................... | 369/275.4 |

*Primary Examiner*—John W. Cabeca
*Assistant Examiner*—Kim-Kwok Chu
*Attorney, Agent, or Firm*—Finnegan, Henderson, Farabow, Garrett & Dunner, L.L.P.

[57] ABSTRACT

The irradiation device irradiates, at the time of recording main information, a first light beam having a first power and a second light beam having a second power on the pre-pits in a time-divisional manner. The light receiving device receives a reflected light of the first light beam from the pre-pits to produce a first light-receipt signal, and receives a reflected light of the second light beam from the pre-pits to produce a second light-receipt signal. The first detector detects the pre-pits based on the first light-receipt signal to produce a first detection signal, and the second detector detects the pre-pits based on the second light-receipt signal to produce a second detection signal. Then, the processor produces a logical sum of the first detection signal and the second detection signal to output a pre-pit detection signal. Therefore, the pre-pits can be correctly detected in both cases where the first light beam and the second light beam is irradiated, and all pre-pits on the storage medium may be detected to obtain the recording information.

6 Claims, 6 Drawing Sheets

PRE-PIT DETECTING DEVICE AND INFORMATION RECORDING APPARATUS EMPLOYING THE SAME

BACKGROUND OF THE INVENTION

1. Field of the Invention

The present invention relates to a write once type storage medium represented by DVD (hereinafter referred to as "DVD-R (DVD-Recordable)") having remarkably higher storage capacity than the conventional Compact Disc. More particularly, the present invention relates to an information recording apparatus which reproduces address information or sync information necessary for the position retrieval at the time of recording information, such as video information, and/or reproduces the wobbling signal used for the rotation control of DVD-R (these information and/or signals will generally be referred to in this specification as "pre-information") from the DVD-R on which these information are recorded in advance, so as to record main information such as video and/or audio information.

2. Description of the Prior Art

There is known a CD-R (CD-Recordable) which has the similar storage capacity to CD and is an optical storage medium on which pre-information is recorded in advance and onto which desired main information, such as video and/or audio information, can be recorded based on the pre-information recorded thereon. The pre-information is recorded on the CD-R, at the pre-formatting stage in the manufacturing process, by forming the information tracks (groove tracks or land tracks) wobbled in a wave-like manner at the frequency corresponding to the signal obtained by frequency-modulating the pre-information to be recorded. In recording information onto the CD-R, the wobbling frequency of the wobbled track is detected, and the reference clock for the rotation control of the CD-R is extracted based on the wobbling frequency thus detected. Then, the drive signal for controlling the rotation of the spindle motor is generated on the basis of the reference clock thus extracted, and the clock signal for recording, including the timing signal in synchronism with the rotation of the CD-R, is generated. In order to record address information, indicating the address on the CD-R and necessary for recording main information, the pre-information is reproduced at the time of recording the main information to detect the position where the main information should be recorded.

When recording main information on CD-R, two types of light beams having different intensities are used. The light beam having higher intensity (hereinafter referred to as "recording power") is used to form recording pits, corresponding to the main information to be recorded, on the information tracks, thereby performing recording. The light beam of lower intensity (hereinafter referred to as "reproduction power") is used for the tracking control of the light beam along the information tracks, although its irradiation does not result formation of the recording pits. In CD-R system, the wobbling frequency is sampled to obtain the pre-information only when the light beam of the reproduction power is irradiated. This is because the period of the wobbling frequency is sufficiently longer than the period of the recording pits corresponding to the main information, and hence the pre-information can be successively detected by the sampling performed only when the light beam is at the reproduction power.

However, the above-mentioned DVD-R has a track pitch, between the neighboring information tracks, of approximately half of that of the CD-R, due to the demand of high density recording. Therefore, the wobbling frequency of the neighboring information tracks may interfere with each other if the information track is wobbled to record the pre-information and then the wobbling frequency is sampled to obtain the pre-information in reproduction. As a result, the wobbling frequency may not be correctly detected. For this reason, in DVD-R, the information tracks (e.g., groove tracks) are wobbled at the frequency based on the reference clock, and additionally the pre-information is also recorded on the track located between two neighboring track (e.g., land track) by forming the pre-pits indicative of the pre-information. Further, the pre-pits are formed substantially uniformly over whole surface of the DVD-R so that the reference clock can be reproduced from these pre-pits if necessary.

When recording main information on the DVD-R, it is necessary to use two light beams of different power, i.e., the recording power and the reproduction power, and this is similar to the situation of CD-R. Accordingly, it is required to correctly detect the pre-pits, not only by the light beam of the reproduction power like the case of CD-R, but by the light beam of the recording power, so that the pre-information can be correctly and constantly reproduced from the DVD-R.

SUMMARY OF THE INVENTION

It is an object of the present invention to provide a pre-pit detecting device which is capable of correctly detecting pre-pits by both of two light beams of different powers.

It is another object of the present invention to provide an information recording apparatus which employs the above described pre-pit detecting device and is capable of accurately recording information on a storage medium.

According to one aspect of the present invention, there is provided a pre-pit detecting device for detecting pre-pits from a storage medium on which recording control information for use in recording information thereon is recorded in advance in the form of the pre-pits, the device including: an irradiation device for irradiating, at the time of recording main information, a first light beam having a first power and a second light beam having a second power on the pre-pits in a time-divisional manner, the second power being different from the first power; a light receiving device for receiving a reflected light of the first light beam from the pre-pits to produce a first light-receipt signal and receiving a reflected light of the second light beam from the pre-pits to produce a second light-receipt signal; a first detector for detecting the pre-pits based on the first light-receipt signal to produce a first detection signal; a second detector for detecting the pre-pits based on the second light-receipt signal to produce a second detection signal; and a processor for producing a logical sum of the first detection signal and the second detection signal to output a pre-pit detection signal.

In accordance with the device thus configured, the irradiation device irradiates, at the time of recording main information, a first light beam having a first power and a second light beam having a second power on the pre-pits in a time-divisional manner. The light receiving device receives a reflected light of the first light beam from the pre-pits to produce a first light-receipt signal, and receives a reflected light of the second light beam from the pre-pits to produce a second light-receipt signal. The first detector detects the pre-pits based on the first light-receipt signal to produce a first detection signal, and the second detector detects the pre-pits based on the second light-receipt signal to produce a second detection signal. Then, the processor produces a logical sum of the first detection signal and the second detection signal to output a pre-pit detection signal. Therefore, the pre-pits can be correctly detected in each case where the first light beam or the second light beam is irradiated, and all pre-pits on the storage medium may be detected to obtain the recording information.

Preferably, the first power is higher than the second power, and the first light beam is used to form recording pits corresponding to the main information on information tracks on the storage medium. By this, the pre-pits can be detected to obtain the recording control information even if the first light beam, used to form the pre-pits, is being irradiated.

The first detector may include a comparator for comparing a first threshold corresponding to the first power with the first light-receipt signal to detect the pre-pits and produce the first detection signal, and the second detector may include a comparator for comparing a second threshold corresponding to the second power with the second light-receipt signal to detect the pre-pits and produce the second detection signal. Thereby, the pre-pits can be detected whichever of the first and second light beams is irradiated.

In a preferred embodiment, the first detector may detect the pre-pits using a first gate signal generated on the basis of first main information corresponding to a timing of irradiating the first light beam to produce the first detection signal, and second detector may detect the pre-pits using a second gate signal generated on the basis of second main information corresponding to a timing of irradiating the second light beam to produce the second detection signal. By this, since the pre-pits are detected using the gate signals which are generated based on the main information corresponding to the respective light beams, the erroneous detection of the pre-pits may be avoided.

In a preferred embodiment, the storage medium may be a disc type storage medium, and the recording control information may include rotation control information which controls the rotation of the disc type storage medium. By this, rotation of the disc type storage medium may be correctly controlled by detecting all pre-pits.

According to another aspect of the present invention, there is provided an information recording apparatus including: a pre-pit detecting device described above; a decoder for decoding the pre-pit detection signal to reproduce the recording control information; and a recording device for recording the main information on the storage medium using the recording control information reproduced by the decoder.

In accordance with the apparatus thus configured, the pre-pit detecting device detects all pre-pits and outputs the pre-pit detection signal, and the decoder decodes the pre-pit detection signal to obtain the recording control information. Then, the recording device records the main information in accordance with the recording control information. Therefore, the main information can be appropriately recorded on the storage medium.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENT

The preferred embodiment of the present invention will now be described below with reference to the attached drawings.

Figure 1:
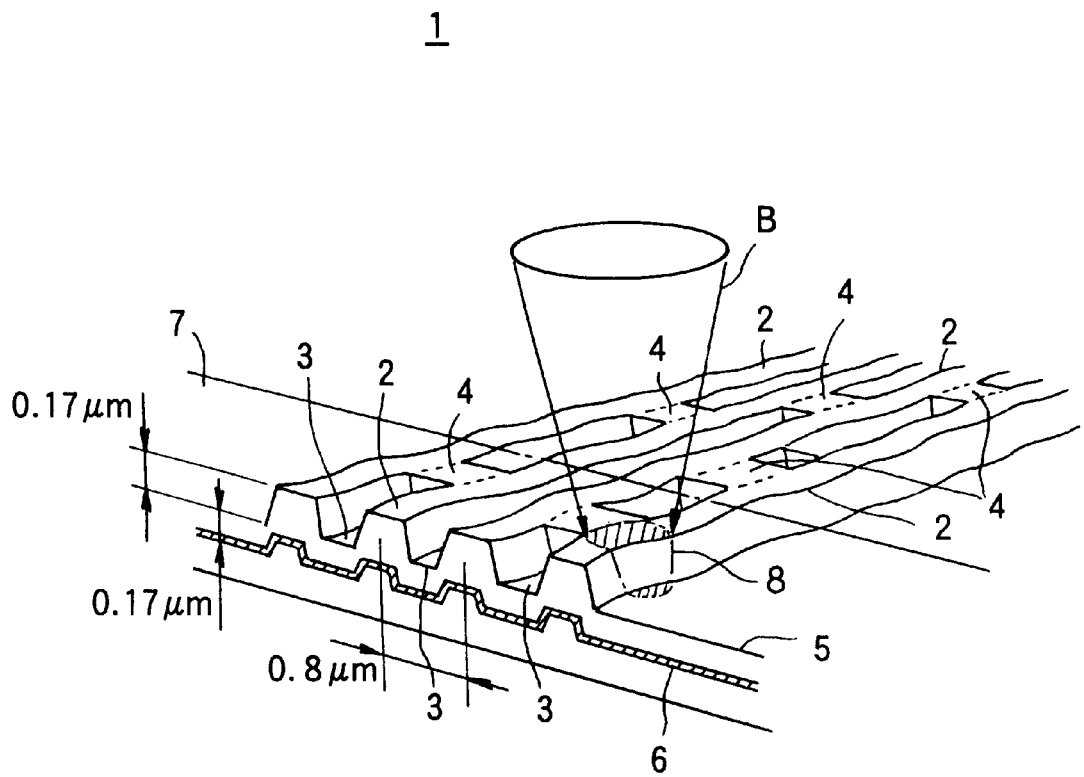
FIG. 1 is a perspective view showing a structure of DVD-R according to an embodiment of the present invention.

[1] Storage medium:

First an embodiment of DVD-R will be described with reference to FIGS. 1 and 2. The DVD-R is a storage medium on which the pre-pits corresponding to the pre-information, serving as recording control information, are formed and the recording control information is recorded by forming the groove tracks wobbled at a predetermined frequency.

First, the structure of the DVD-R according to the present invention will be described with referring to FIG. 1. In FIG. 1, the DVD-R 1 is a write-once type dye DVD-R having the dye film 5, and is formed with the groove tracks 2 serving as information track and the land tracks 3 which function as the neighboring tracks for guiding the laser beam B for recording and reproduction along the groove tracks 2. The DVD-R 1 is further provided with the protection film 7 for protecting the groove tracks 2 and land tracks 3, and the gold-deposition surface 6 for reflecting the light beam B at the time of reproducing the recorded information. The land tracks 3 are formed with the pre-pits 4 corresponding to the pre-information. The pre-pits 4 are formed before the DVD-R 1 is put on the market.

On the DVD-R 1, the groove tracks 2 are wobbled at the frequency corresponding to the rotation rate of the DVD-R 1. The recording of the recording control information, by wobbling the groove tracks 2, is carried out before the DVD-R 1 is put on the market, like the formation of the pre-pits 4.

When recording the main information (such as video and/or audio information to be recorded, other than the pre-information. The term "main information" will be used hereinafter for this meaning through this specification.), the information recording apparatus, described later in detail, samples the wobbling frequency of the groove tracks 2 and detects the pre-pits 4 to obtain the pre-information, thereby controlling the rotation of the DVD-R 1 at the given rotation rate. Simultaneously, the information recording apparatus sets the optimum output power of the light beam B based on the pre-information thus obtained, and obtains the address information indicative of the position on the DVD-R 1 where the main information is to be recorded. Thereafter, the information recording apparatus records the main information on the appropriate position on the DVD-R 1 based on the address information thus obtained.

The main information is recorded in such a manner that the light beam B is moved to trace, by its beam center, the center of the groove tracks 2 to form the information pits corresponding to the main information on the groove tracks 2. As shown in FIG. 1, the size of the light spot 8 is determined so that the light spot 8 covers not only the groove tracks 2 but partially the land tracks 3. Using the reflected portion of the light spot 8 from the land tracks 3 with the push-pull method, the pre-information is detected from the pre-pits 4. In this case, the above push-pull method uses the photodetectors divided by the dividing lines parallel to the rotation direction of the DVD-R 1, and this method will be hereinafter referred to as "radial push-pull method". Further, from the reflected portion of the light spot 8 from the groove tracks 2, the wobbling signal is detected as the pre-information to obtain the clock signal used for the rotation control.

Next, the recording format of the pre-information recorded beforehand on the DVD-R 1 according to the present invention will be described with reference to FIG. 2. In FIG. 2, the upper part of the illustration represents the recording format of the main information, and the lower part of illustration in the form of the waveform represents the wobbling state of the groove track 2 (plan view of the groove track 2) on which the main information is to be recorded. The upward arrows between the main information and the wobbling state of the groove track 2 schematically represent the positions where the pre-pits 4 are formed. It is noted that, in FIG. 2, the wobbling state of the groove track 2 is illustrated to have larger magnitude than it really is, to assist the understanding of the reader. The main information is recorded on the center line of the groove track 2.

Figure 2:
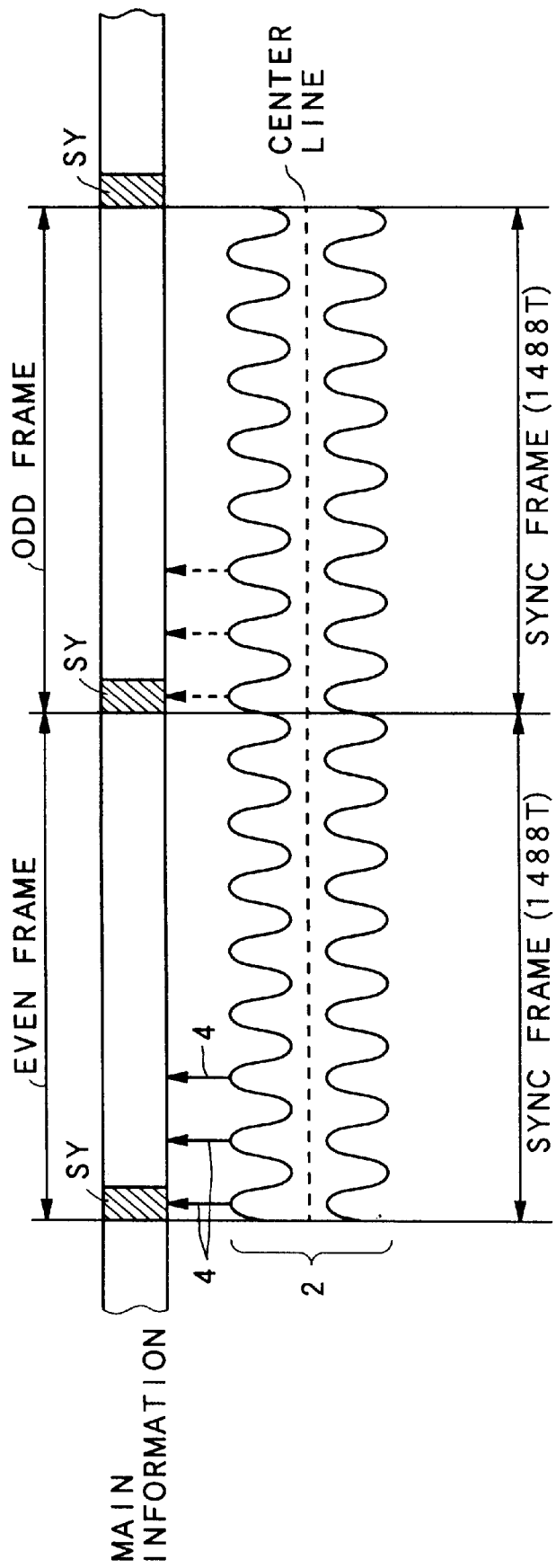
FIG. 2 is an example of recording format of the DVD-R according to an embodiment of the present invention.

As shown in FIG. 2, the main information to be recorded on the DVD-R 1 is divided, in advance, into a plurality of sync frames, each of which serves as a unit information. 26 sync frames constitute one recording sector, and 16 recording sectors constitute one ECC (Error Correction Code) block. One sync frame has a length (i.e., 1488T) of 1488 times longer than a unit length T which corresponds to the bit interval prescribed by the recording format in recording the main information. The sync frame includes the sync information SY, having the length of 14T at its leading portion, which is used for establishing the synchronization of the respective sync frames.

The pre-information, recorded on the DVD-R 1 according to the present invention, is recorded in every sync frame. When recording the pre-information in the form of pre-pits 4, one pre-pit 4 indicating the sync signal is necessarily formed on the land track 3 adjacent to the area of the sync frame where the sync information SY is recorded. Further, one or two additional pre-pits 4 are formed on the land track 3 at the position adjacent to the leading portion of the sync frame other than the sync information SY (e.g., following the sync information SY), so as to indicate the contents (address information) of the pre-information to be recorded. It is noted that, in some cases, no pre-pit 4 may be recorded at the front half portion of the sync frame except for the sync information SY, depending of the contents of the pre-information to be recorded. The pre-pits 4 may be formed only in one of the even numbered sync frames (hereinafter referred to as "EVEN frame") and the odd numbered sync frames (hereinafter referred to as "ODD frame") to record pre-information. In this embodiment, the pre-pits 4 are formed in the EVEN frames (as shown by the solid arrows in FIG. 2), but no pre-pit 4 is formed in the ODD frames adjacent thereto (as shown by the broken arrows in FIG. 2).

The groove track 2 is wobbled at the constant wobbling frequency $f_0$ of 140 kHz. Here, the wobbling frequency $f_0$ is determined such that one sync frame corresponds to 8 waves, and the period of the wobbling frequency $f_0$ corresponds to 186T. The above mentioned information recording apparatus detects the wobbling signal having the constant wobbling frequency $f_0$ thereby to detect the signal used for the rotation control of the spindle motor.

[2] Configuration and operation of the information recording apparatus:

Next, an embodiment of the information recording apparatus according to the present invention will be described with reference to FIGS. 3 to 6. The following description is directed to the case in which the information recording apparatus records the digital information, transmitted from the host computer, onto the DVD-R.

First, the whole configuration and the operation of the information recording apparatus will be described with reference to FIG. 3. Now, it is assumed that the DVD-R 1 is formed with the pre-pits 4, including the address information on the DVD-R, and the wobbled groove tracks 2 in advance. At the time of recording the digital information, the information recording apparatus detects the pre-pits 4 to obtain the address information on the DVD-R 1, and then searches for the position where the digital information is to be recorded by referring to the address information thus obtained, thereby performing recording.

Figure 3:
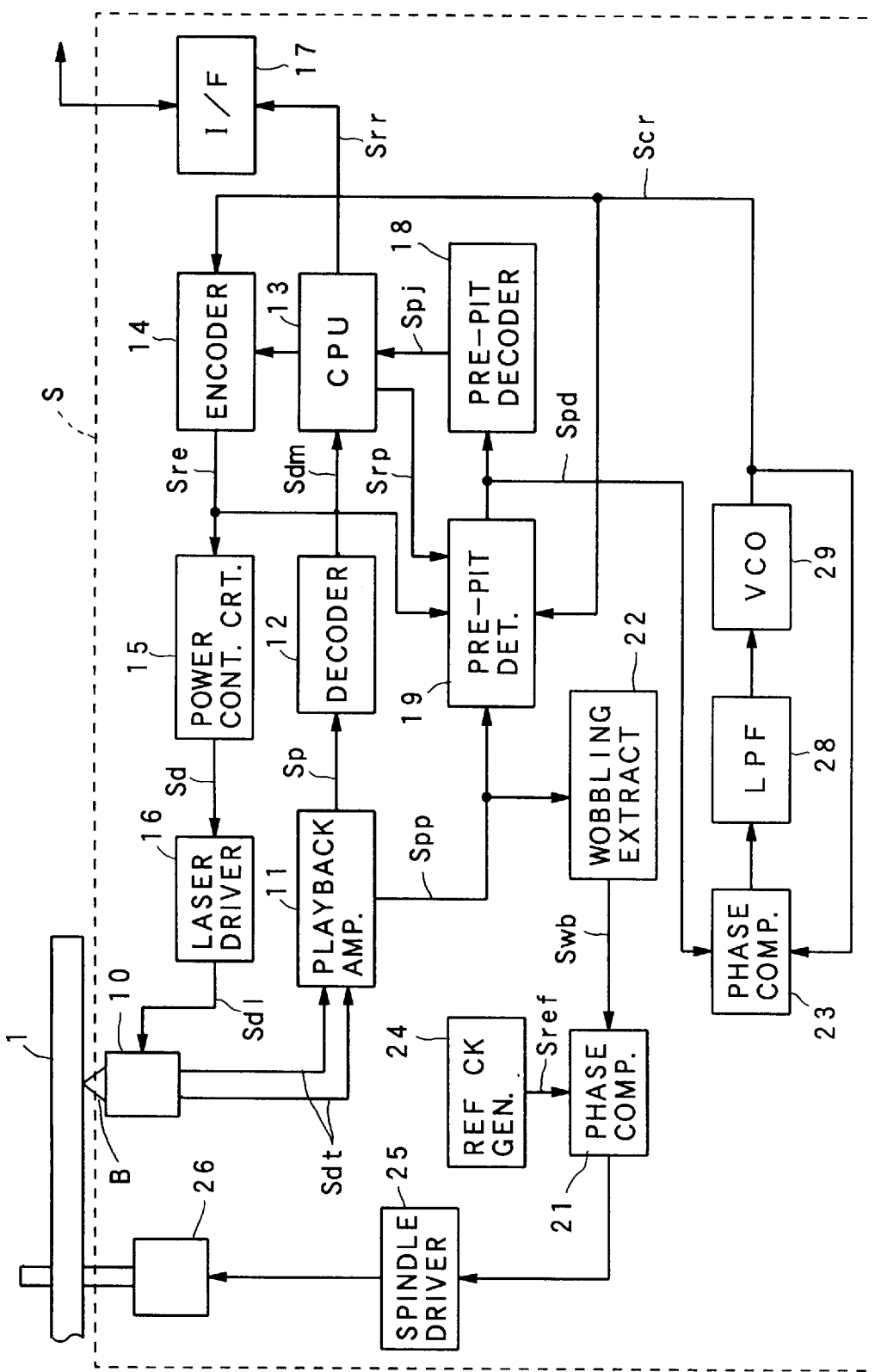
FIG. 3 is a block diagram showing a schematic configuration of an information recording apparatus according to the present invention.

As shown in FIG. 3, the information recording apparatus S according to this embodiment includes the pickup 10, the playback amplifier 11, the decoder 12, the CPU 13, the encoder 14, the power control circuit 15, the laser drive circuit 16, the pre-pit signal decoder 18, the pre-pit signal detector 19, the phase comparators 21 and 23, the wobbling signal extractor 22, the reference clock generator 24, the spindle driver 25, the spindle motor 26, the LPF (Low Pass Filter) 28 and the VCO (Voltage Controlled Oscillator) 29. The information recording apparatus S receives the digital information Srr from the external host computer via the interface 17.

Next, the operation of the information recording apparatus will be described. The pickup 10 includes a laser diode, a polarization beam splitter, photodetectors, etc., which are not shown, and irradiates the light beam B on the information recording surface of the DVD-R 1 based on the laser drive signal Sdl. Then, the pickup 10 receives the reflected light beam and detects the pre-pits 4 and the wobbling frequency of the groove tracks 2, according to the radial push-pull method, to record digital information Srr. Additionally, if certain digital information has already been recorded, the pickup 10 detects the digital information recorded in advance based on the reflected light of the light beam B.

The playback amplifier 11 amplifies the pickup detection signal Sdt, including information corresponding to the pre-pits 4 and the wobbling signal of the groove tracks 2, outputted by the pickup 10. Then, the playback amplifier 11 outputs the pre-information signal Spp corresponding to the pre-pits 4 and the wobbling signal of the groove tracks 2 as well as the amplified signal Sp corresponding to the digital information already recorded on the DVD-R 1. Thereafter, the decoder 12 applies the 8–16 demodulation and de-interleaving onto the amplified signal Sp, and supplies the demodulated signal Sdm to the CPU 13.

The pre-pit signal detector 19 supplies the pre-pit detection signal Spd, which is a pulse signal, to the pre-pit signal decoder 18 and the phase comparator 23 on the basis of the pre-information signal Spp. The phase comparator 23, the LPF 28 and the VCO 29 constitute a so-called PLL (Phase Locked Loop) circuit, which supplies the recording clock signal Scr in synchronism with the phase of the input pre-pit detection signal Spd to the encoder 14 and the pre-pit signal detector 19.

The wobbling signal extractor 22 includes a BPF (Band Pass Filter) for extracting the wobbling signal component from the pre-information signal Spp and a comparator for comparing the wobbling signal component thus extracted with a given reference value, and outputs the pulse signal when the wobbling signal component has the magnitude level higher than the given reference value. In other words, the wobbling signal extractor 22 pulses the wobbling signal component, and supplies the pulsed component to the phase comparator 21 as the extracted wobbling signal component Swb.

The phase comparator 21 makes the phase comparison of the extracted wobbling signal Swb with the reference clock signal Sref, which includes the reference frequency component of the rotation rate of the DVD-R 1 supplied from the reference clock generator 24, and supplies the difference signal to the spindle motor via the spindle driver 25 as the rotation control signal. By this, the spindle servo control is applied to the spindle motor 26, and hence the DVD-R 1 rotates at the rotation rate according to the frequency and the phase of the reference clock signal Sref.

The interface 17 interfaces the digital information Srr transmitted from the host computer with the information recording apparatus S under the control of the CPU 13, and supplies the digital signal Srr to the encoder 14 via the CPU 13. The encoder 14 generates the modulated signal Sre by the ECC generation processing, the 8–16 modulation and the scrambling with using the recording clock signal Scr as the timing signal, and supplies the modulated signal Sre to the power control circuit 15 and the pre-pit signal detector 19.

The power control circuit 15 carries out the waveform shaping of the modulated signal Sre (so-called "light strategy processing") based on the recording clock signal Scr so as to enable the formation of appropriately shaped recording pits on the DVD-R 1, and outputs the resultant signal as the recording signal Sd for driving the laser diode (not shown) within the pickup 10. The laser drive circuit 16 outputs the laser drive signal Sdl for driving the laser diode to emit the light beam B, on the basis of the recording signal Sd.

The CPU 13 obtains the pre-information from the pre-information decode signal Spj which is produced by the pre-pit decoder 18, and controls the recording performance of the digital information Srr on the DVD-R 1 at the position corresponding to the address information included in the pre-information. Simultaneously, the CPU 13 outputs the reproduction signal, corresponding to the digital information recorded in advance, via the interface 17 to an external unit, and also performs total control of the information recording apparatus S. Further, the CPU 13 produces the status indication signal Srp which indicates whether or not the information recording apparatus S is in the recording status or in the reproduction status, and supplies it to the pre-pit signal detector 19.

Figure 4:
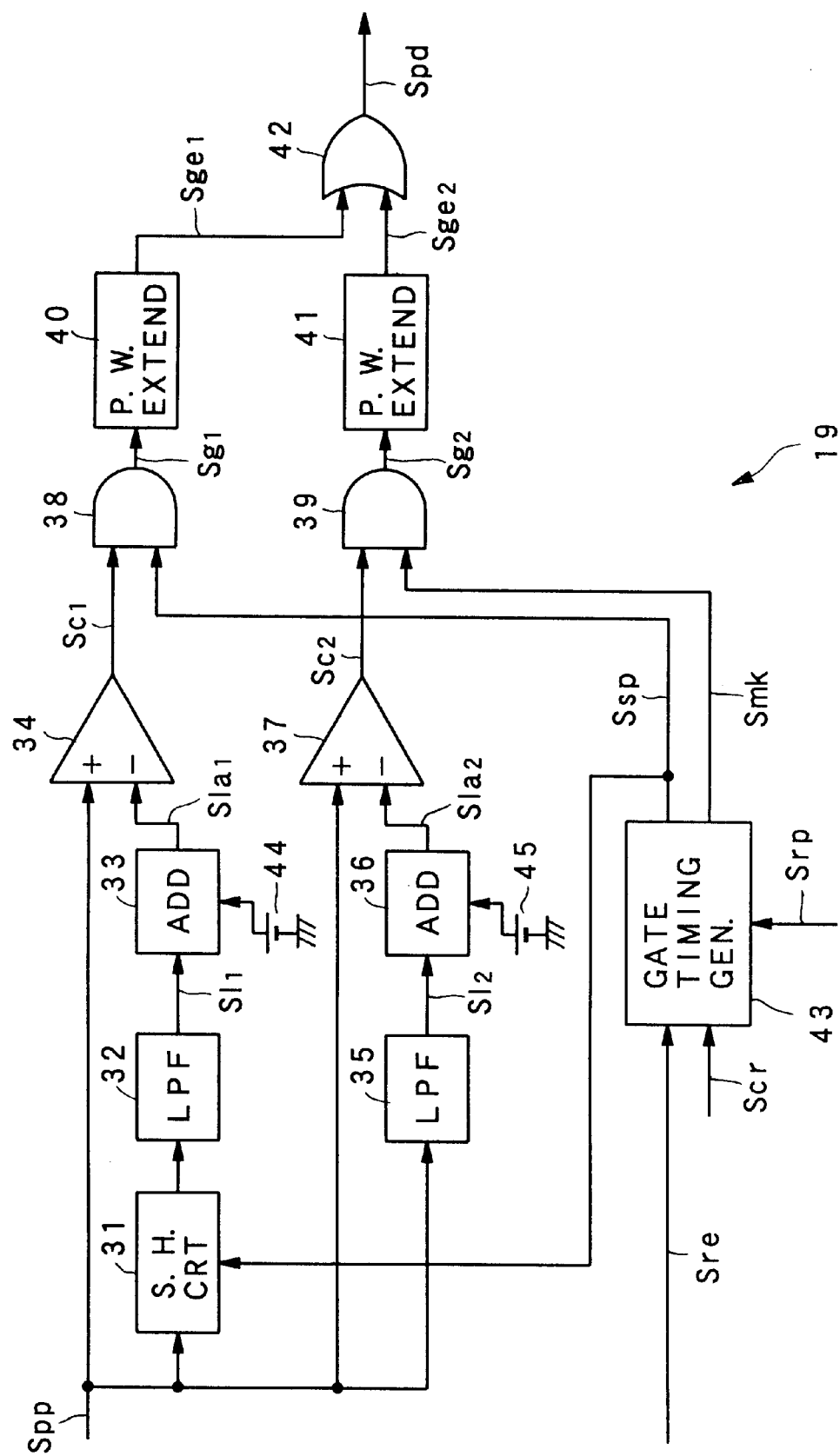
FIG. 4 is a block diagram showing a detailed configuration of the pre-pit signal detector shown in FIG. 3.
Figure 5:
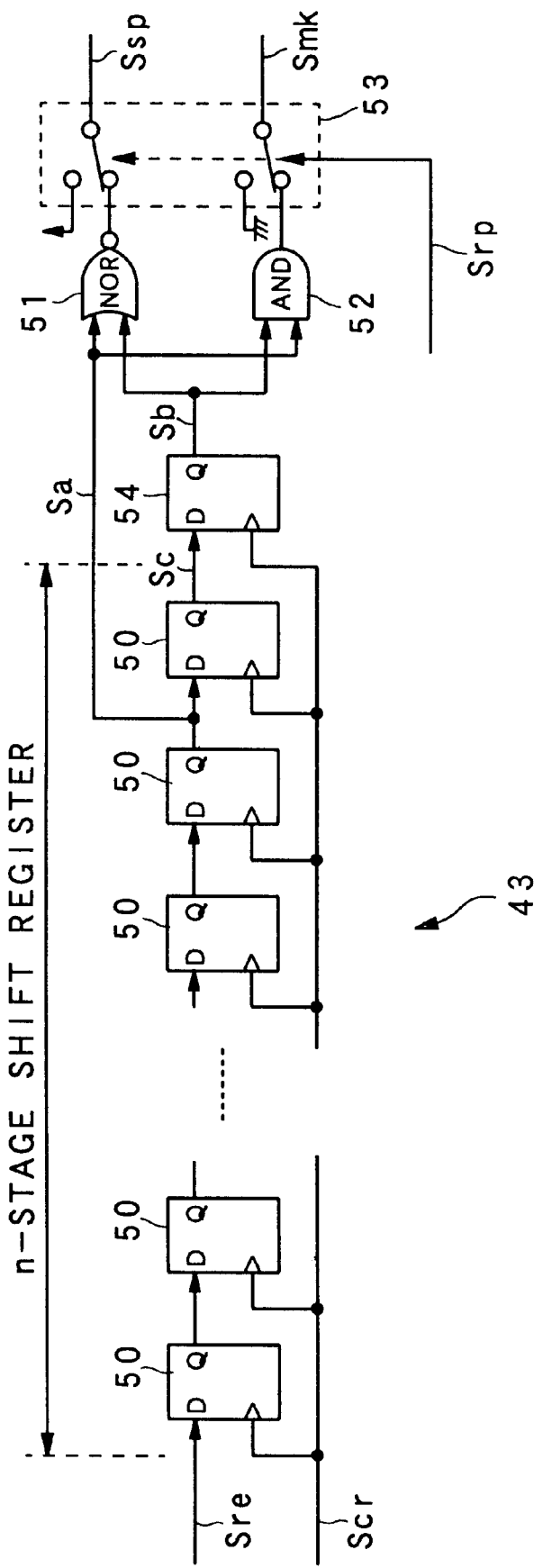
FIG. 5 is a block diagram showing a detailed configuration of the gate timing generator shown in FIG. 3.
Figure 6:
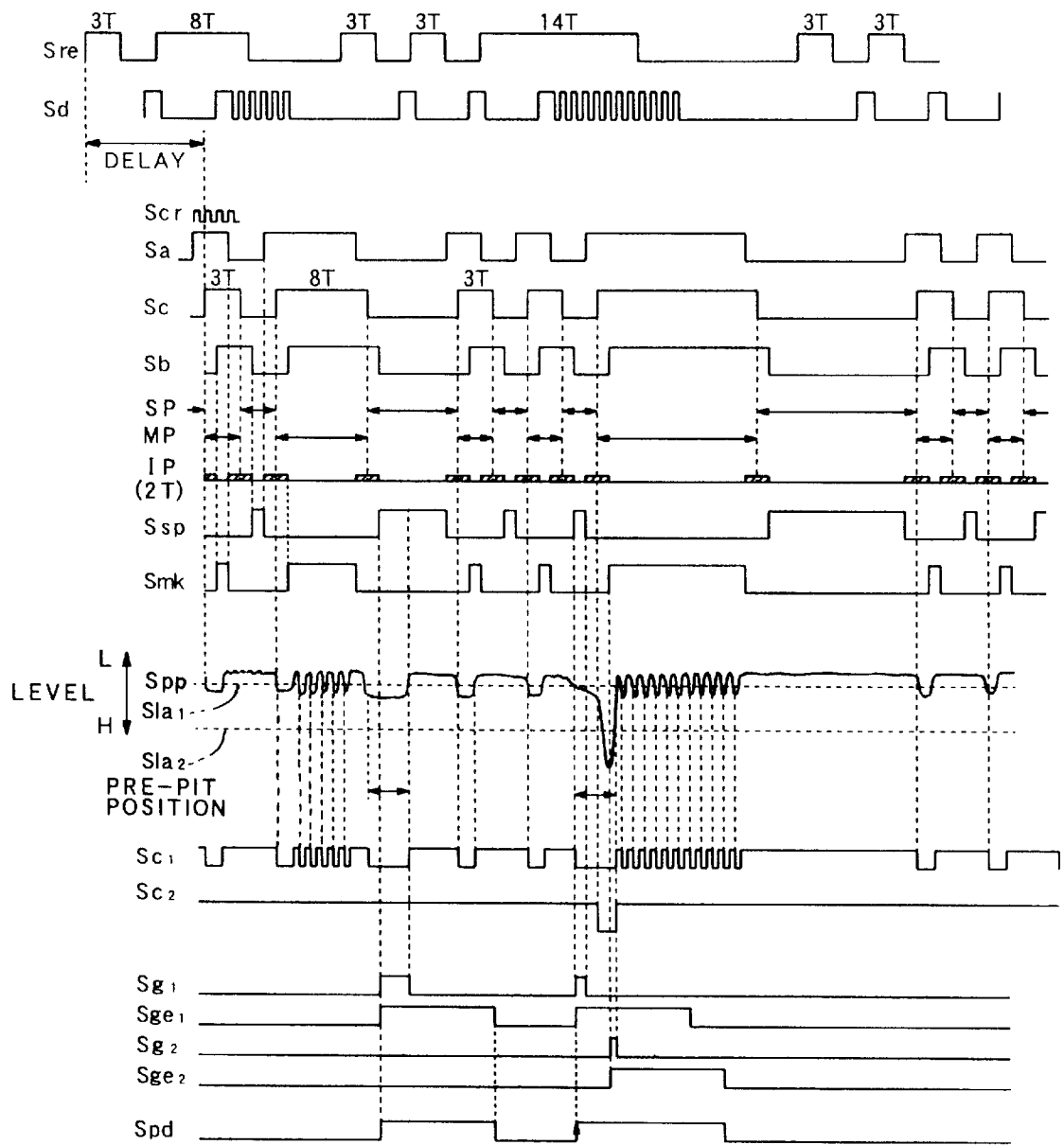
FIG. 6 is a timing chart showing the operation of the pre-pit detector shown in FIG. 3.

[3] Detailed configuration and operation of pre-pit signal detector:

Next, the description will be given of the detailed configuration and the operation of the pre-pit signal detector 19 with reference to FIGS. 4 to 6. FIG. 4 is a block diagram showing the whole configuration of the pre-pit detector 19, FIG. 5 is a block diagram showing the details of the gate timing generator 43 described later, and FIG. 6 is a timing chart showing the operation of each component in the pre-pit signal detector 19.

As shown in FIG. 4, the pre-pit detector 19 includes the sample-hold circuit 31, the LPF 32 (having the cutoff frequency of some kHz), the adder 33, the reference voltage generator 44, the comparator 34, the AND circuit 38, the LPF 35 (having the cutoff frequency of some kHz), the adder 36, the reference voltage generator 45, the comparator 37, the AND circuit 39, the gate timing generator 43, the pulse width extender 40 and 41, and the OR circuit 42. The gate timing generator 43 includes, as shown in FIG. 5, n D-type flip-flop circuits 50 (delay amount T) constituting the n-stage shift register, the D-type flip-flop circuit 54 (delay amount T), the NOR circuit 51, the AND circuit 52, and the switch unit 53.

Next, the operation of the pre-pit signal detector 19 will be described with reference to FIGS. 4 to 6.

(i) Recording information:

First, the description will be given of the operation of the pre-pit signal detector 19 with which the digital information Srr is recorded on the DVD-R 1.

The gate timing generator 43 receives the modulated signal Sre (see. FIG. 6), the status indication signal Srp and the recording clock signal Scr. The modulated signal Sre is supplied to the input terminal of the first-stage flip-flop circuit 50 of the n-stages shift register, and the recording clock signal Scr is supplied to the clock input terminals of the respective flip-flop circuits 50 and 54 in a parallel fashion. By this configuration, the modulated signal Sre is delayed for the delay amount corresponding to the n-stages of the flip-flop circuits 50 (specifically, n×T sec). This delay amount is determined to be equal to the sum (i.e., total delay) of the respective fixed delay amounts of the power control circuit 15, the laser drive circuit 16, the pickup 10, the playback amplifier 11 and the BPF 20, so that the digital information Srr is recorded with the demodulated signal Sre being synchronized with the pre-information decode signal Spj outputted by the pre-pit signal decoder 18.

The delay signal Sc, outputted by the last-stage flip-flop circuit 50 (see. FIG. 6), is supplied to the input terminal of the flip-flop circuit 54. The delay signal Sa, which is the input signal of the last-stage flip-flop circuit 50, and the delay signal Sb, which is the output signal of the flip-flop circuit 54, are supplied to the NOR circuit 51 and the AND circuit 52 individually, as shown in FIG. 5. The phase difference between the delay signal Sa and the delay signal Sc is T, and the phase difference between the delay signal Sb and the delay signal Sc is also T.

The NOR circuit 51 produces the negation of the logical sum of the delay signals Sa and Sb, and supplies it to the switch unit 53. The AND circuit 52 produces the logical product of the delay signals Sa and Sb, and supplies it to the switch 53. The switch unit 53 receives the status indication signal Srp. When the information recording apparatus S is in recording operation, the switch unit 53 outputs the negation of the logical sum of the delay signals Sa and Sb as the space gate signal Ssp which is the gate signal of the space period SP, and also outputs the logical product of the delay signals Sa and Sb as the mark gate signal Smk which is the gate signal of the mark period MP. Here, it is noted that the space period SP is the time period in which the light beam B of the reproduction power is being irradiated on the DVD-R 1, and the mark period MP is the time period in which the light beam B of the recording power is being irradiated on the DVD-R 1 to record information. On the contrary, when the information recording apparatus S is reproducing the information recorded on the DVD-R 1, the switch unit 53 is switched over by the status indication signal Srp so that the signals of constant voltages are outputted therefrom as the space gate signal Ssp and the mark gate signal Smk.

When recording information, the space gate signal Ssp is the gate signal indicating the time period in which the detection of the pre-pit 4 is enabled in the space period SP, and the mark gate signal Smk is the gate signal indicating the time period in which the detection of the pre-pit 4 is enabled in the mark period MP. During the time period in which both of the space gate signal Ssp and the mark gate signal Smk take "L" level (i.e., the period of 1T before and after the switching timing of the space period SP and the mark period MP, as shown in FIG. 6), the detection of the pre-pits 4 is inhibited (this will be referred to as "detection inhibited period IP", See. FIG. 6). The following are the reasons why the gate timing generator 43 provides such a detection inhibited period IP. At the transition periods between the space period Sp and the mark period MP, the output power of the laser diode changes between the recording power and the reproduction power, and at this time, the power of the light beam B may excessively change due to the transitional change of the laser diode output. In such a case, the pre-pit information signal Spp changes as if the pre-pits 4 exists and the pre-pit detection signal Spd erroneously indicates the presence of the pre-pits 4 due to such excessive change, although there actually is no pre-pit 4. In order to avoid this improper detection, the gate timing generator 43 generates the space gate signal Ssp and the mark gate signal Smk and determines the 2T period before and after the laser power switching timing as the detection inhibiting period IP, thereby detecting the pre-pits 4 only when at least one of the space gate signal Ssp and the mark gate signal Smk is at "H" level.

The pre-information signal Spp inputted to the pre-pit signal detector 19 is supplied to the comparators 34 and 37, the sample-hold circuit 31 and the LPF 35. If the rotation of the DVD-R 1 includes the eccentricity, the pre-information signal itself indicates the level variation corresponding to the period of the eccentricity. The sample-hold circuit 31 samples and holds the pre-information signal Spp to alter the threshold value correspondingly to this level variation. This sample-hold processing is needed to detect the pre-pits 4 in the space period in which the influence of the variation of the pre-information signal Spp due to the eccentricity remarkably appears. The sample-hold circuit 31 receives the space gate signal Ssp and performs the sample-hold operation only for the period represented by the space gate signal Ssp.

The pre-information signal Spp after the sample-hold operation is supplied to the LPF 32 which extracts only the low frequency component, and the low frequency component thus extracted is supplied to the adder 33 as the low frequency component signal $Sl_1$. To the adder 33, the reference voltage generated by the reference voltage generator 44 is supplied. This reference voltage is determined in consideration of the values of the pre-information signal Spp when the pre-pit 4 is detected and not detected. The adder 33 adds the reference voltage to the low frequency component signal $Sl_1$, and outputs the resultant signal as the threshold signal $Sla_1$ which serves as the first threshold. The threshold signal $Sla_1$ has such a waveform that the low frequency component signal $Sl_1$ is shifted for the amount of the reference voltage from the reference voltage generator 44, and has the voltage value, in the space period SP, between values of the pre-information signal Spp when the pre-pit 4 is detected and not detected (see. FIG. 6).

Then, the comparator 34 compares the threshold signal $Sla_1$ and the pre-information signal Spp to output the comparison signal $Sc_1$ which indicates the portion where the pre-information signal Spp exceeds the level of the threshold signal $Sla_1$ (i.e., portion indicating the timings of the pre-pits 4 in the space period SP and the timings at which the laser beam is irradiated at the recording power in the mark period MP). The AND circuit 38 produces the logical product signal $Sg_1$ which is the logical product of the comparison signal $Sc_1$ and the space gate signal Ssp. This logical product signal $Sgj_1$ indicates the presence or absence of the pre-pits 4 in the space period SP. The pulse width extender 40 extends the pulse width and outputs the resultant signal as the detection signal $Sge_1$ to the OR circuit 42.

The pulse width extension by the pulse width extender 40 is required to correctly output the signal corresponding to the pre-pits 4 as the detection signal $Sg_1$, and the extension degree is set such that a single pulse in the logical product signal $Sg_1$ becomes a pulse of length larger than 2T and shorter than 186T (i.e., the pulse length which enables the correct detection and discrimination of the pre-pits 4 from the most adjacent ones (see. FIG. 2)).

The pre-information Spp is also supplied to the LPF 35 where the low frequency component is extracted therefrom, and the component is supplied to the adder 36 as the low frequency component signal $Sl_2$. To the adder 36, the reference voltage generated by the reference voltage generator 45 is supplied. This reference voltage is determined in consideration of the value of the pre-information signal Spp in the mark period MP when the pre-pits 4 are detected and not detected. The adder 36 adds the reference voltage with the low frequency component signal $Sl_2$, and outputs the threshold signal $Sla_2$ serving as the second threshold value. This threshold signal $Sla_2$ has such a waveform that the low frequency component signal $Sl_2$ is shifted for the amount of the reference voltage from the reference voltage generator 45 and has the voltage between the values of the pre-information signal Spp when the pre-pits 4 are detected or not detected in the mark period MP.

The comparator 37 compares the threshold signal $Sla_2$ with the pre-information signal Spp to output the comparison signal $Sc_2$ which is the portion of the pre-information signal $Sla_2$ exceeding the threshold signal $Sla_2$ (i.e., indicating the timings of the pre-pits 4). The AND circuit 39 produces the logical product signal $Sg_2$ which is the logical product of the comparison signal $Sc_2$ and the mark gate signal Smk. This logical product signal $Sg_2$ indicates the presence or absence of the pre-pits 4 in the mark period MP. The pulse width extender 41 extends the pulse width of the logical product signal $Sg_2$ in the same manner as the pulse width extender 40 and outputs the detection signal $Sge_2$ to the OR circuit 42. The OR circuit 42 produces the logical sum of the detection signals $Sge_1$ and $Sge_2$, and outputs it as the pre-pit detection signal Spd.

If the pre-pits 4 exist in the time period when the light beam B of the reproduction power is being irradiated, the pulses of only the logical product signal $Sg_1$ are extended and outputted as the pre-pit detection signal Spd, as seen in FIG. 6. If the pre-pits 4 exist before and after the transitions between the recording power period and the reproduction power period of the light beam B, the pre-pit detection signal Spd is the logical sum of the detection signal $Sge_1$, in which the pulse of the logical product signal $Sg_1$ is extended, and the detection signal $Sge_2$, in which the pulse of the logical product signal $Sg_2$ is extended, as seen in FIG. 6. By this, it is possible to avoid double detection of the same pre-pit 4 before and after the transition of the power of the light beam B.

Although it is not illustrated in FIG. 6, if the pre-pits 4 exist in the time period when the light beam B of only the recording power is irradiated, the pulses of only the logical product signal $Sg_2$ are extended and outputted as the pre-pit detection signal Spd.

According to the operation of the pre-pit signal detector 19 described above, the pre-pits 4 can be appropriately detected to obtain the pre-information even if the power of the light beam B changes between the recording power and the reproduction power.

(ii) Reproducing Information:

Next, the description will be given of the operation of the pre-pit signal detector 19 at the time of reproducing the digital information Srr from the DVD-R 1.

In reproduction of the recorded information, the switch unit 53 in the gate timing generator 43 is turned over in accordance with the status indication signal Srp to constantly output the fixed voltages as the space gate signal Ssp and the mark gate signal Smk. On the other hand, the light beam B is constantly of the reproduction power, and hence the level of the pre-information signal Spp at the timing of the presence of the pre-pit 4 exceeds the level of the threshold signal $Sla_1$ set by the adder 33. As a result, the comparison signal $Sc_1$, the logical product signal $Sg_1$ and the detection signal $Sge_1$ corresponding to the pre-pit 4 are outputted. However, the level of the pre-information signal Spp at the timing of the presence of the pre-pit 4 does not exceed the level of the threshold signal $Sla_2$ because the light beam B is not of the recording power. Hence, the comparison signal $Sc_2$, the logical product signal $Sg_2$ and the detection signal $Sge_2$ of "L" level are outputted. Accordingly, the pre-pit detection signal Spd of the waveform based on the detection signal $Sge_1$ is outputted.

As described above, the pre-pit signal detector 19 in the information recording apparatus S can detect the pre-pits 4 in both space period SP and the mark period MP at the time of recording information, and hence all pre-pits 4 on the DVD-R 1 can be detected to obtain the pre-information. Further, since the block including the LPF 32, the adder 33, the comparator 34 and the AND circuit 38, and the block including the LPF 35, the adder 36, the comparator 37 and the AND circuit 39 output the detection signals $Sge_1$ and $Sge_2$, respectively, using the thresholds corresponding to their light beam power, the pre-pits 4 may be correctly detected at both the recording power and the reproduction power. Since the pre-pits 4 are detected using the gate signals Ssp and Smk generated based on the modulated signal Sre, the erroneous detection of the pre-pits 4 may be avoided even if the pre-pits 4 are formed in a manner bridging over the space period SP and the mark period MP. Additionally, the rotation of the DVD-R 1 may be accurately controlled by detecting all pre-pits 4. Still further, the pre-pit detection signal Spd is decoded to obtain the pre-information, and the digital information Srr is recorded on the DVD-R 1. Therefore, the digital information Srr may be recorded with obtaining all pre-information from the pre-pits 4 on the DVD-R 1, thereby accomplishing accurate and reliable recording of the digital information Srr.

The above description is directed to the DVD-R which is a write-once type optical disc. However, this invention is applicable to a rewritable type optical disc using so-called phase-change material in its recording layer. In such a case, an additional light beam of the erasing power is prepared in addition to those light beams of the recording and reproduction power, and the light beam of those three different power are time-divisionally applied to the disc. In order to apply the present invention, an additional pre-pit detection block, including an LPF, an adder, a reference voltage generator, a comparator, an AND circuit and a pulse width extender, is employed to produce the logical sum of the detection signal from this additional block and other two detection signals $Sge_1$ and $Sge_2$ to output the pre-pit detection signal.

Also, the above description is directed to the example in which the unique recording power is employed. If it is desired to alter the recording power based on the difference of the pulse widths of the recording signal Sd, outputted from the power control circuit 15 and applied with the light strategy processing, an additional pre-pit detection block in which the reference voltages are different between the top pulse and following pulse array is employed (e.g., the initial pulse in the recording signal period of the recording signal Sd, hereinafter referred to as "top pulse", has a pulse width different from the following pulses) to produce the logical sum of the pre-pit detection signal from this block and the pre-pit detection signal from the pre-pit detection block of the reproduction power.

Further, although the above description is directed to the application of the present invention to the DVD-R, the applicability of the present invention is not limited to this style. For instance, the concept of the present invention is also applicable to the recording of the digital information on a storage medium (such as tape like storage medium) which carries information for the recording control in the form of wobbling and/or pre-pits of the tracks.

What is claimed is:

1. A pre-pit detecting device for detecting pre-pits from a storage medium on which recording control information for use in recording information thereon is recorded in advance in the form of the pre-pits, said device comprising:

an irradiation device for irradiating, at the time of recording main information, a first light beam having a first power and a second light beam having a second power on the pre-pits in a time-divisional manner, the second power being different from the first power;

a light receiving device for receiving a reflected light of the first light beam from the pre-pits to produce a first light-receipt signal and receiving a reflected light of the second light beam from the pre-pits to produce a second light-receipt signal;

a first detector for detecting the pre-pits based on the first light-receipt signal to produce a first detection signal;

a second detector for detecting the pre-pits based on the second light-receipt signal to produce a second detection signal; and a processor for producing a logical sum of the first detection signal and the second detection signal to output a pre-pit detection signal.

2. A pre-pit detecting device according to claim 1, wherein the first power is higher than the second power and the first light beam is used to form recording pits corresponding to the main information on information tracks on the storage medium.

3. A pre-pit detecting device according to claim 1, wherein the first detector comprising a comparator for comparing a first threshold corresponding to the first power with the first light-receipt signal to detect the pre-pits and produce the first detection signal, and the second detector comprising a comparator for comparing a second threshold corresponding to the second power with the second light-receipt signal to detect the pre-pits and produce the second detection signal.

4. A pre-pit detecting device according to claim 1, wherein the first detector detects the pre-pits using a first gate signal generated on the basis of first main information corresponding to a timing of irradiating the first light beam to produce the first detection signal, and second detector detects the pre-pits using a second gate signal generated on the basis of second main information corresponding to a timing of irradiating the second light beam to produce the second detection signal.

5. A pre-pit detecting device according to claim 1, wherein the storage medium comprises a disc type storage medium, and the recording control information comprises rotation control information which controls the rotation of the disc type storage medium.

6. An information recording apparatus comprising:

a pre-pit detecting device according to claim 1;

a decoder for decoding the pre-pit detection signal to reproduce the recording control information; and a recording device for recording the main information on the storage medium using the recording control information reproduced by the decoder.

\* \* \* \* \*